(12) United States Patent
King et al.

(10) Patent No.: US 10,174,952 B1
(45) Date of Patent: Jan. 8, 2019

(54) TAILGATE FOOD PREPARATION ASSEMBLY

(71) Applicants: William Russell King, Shreveport, LA (US); Kay D. King, Shreveport, LA (US)

(72) Inventors: William Russell King, Shreveport, LA (US); Kay D. King, Shreveport, LA (US)

( * ) Notice: Subject to any disclaimer, the term of this patent is extended or adjusted under 35 U.S.C. 154(b) by 0 days.

(21) Appl. No.: 15/397,156

(22) Filed: Jan. 3, 2017

Related U.S. Application Data

(60) Provisional application No. 62/274,590, filed on Jan. 4, 2016.

(51) Int. Cl.
*F24C 3/14* (2006.01)
*A47J 37/07* (2006.01)

(52) U.S. Cl.
CPC ............. *F24C 3/14* (2013.01); *A47J 37/0713* (2013.01); *A47J 37/0763* (2013.01)

(58) Field of Classification Search
CPC ....... F24C 3/14; A47J 37/0713; A47J 37/0763
See application file for complete search history.

(56) References Cited

U.S. PATENT DOCUMENTS

| | | | |
|---|---|---|---|
| 3,940,175 A * | 2/1976 | Robison | B60P 3/025 296/22 |
| 4,089,554 A | 5/1978 | Myers | |
| 5,640,949 A | 6/1997 | Smith | |
| 5,950,617 A | 9/1999 | Lorenz | |
| 6,416,101 B1 * | 7/2002 | Bartch | B60P 3/0257 296/168 |
| 6,575,155 B2 | 6/2003 | Brennan | |
| 6,814,383 B2 | 11/2004 | Reed, III et al. | |
| 6,877,505 B1 | 4/2005 | Den Hoed | |
| 7,104,667 B2 | 9/2006 | Keller | |
| 8,387,610 B1 | 3/2013 | Candelaria, Jr. | |
| 8,672,200 B2 | 3/2014 | O'Hare | |
| 8,820,313 B1 | 9/2014 | Lutes | |
| 2001/0042545 A1 | 11/2001 | Robin | |
| 2008/0098902 A1 | 5/2008 | Mansfield et al. | |

\* cited by examiner

*Primary Examiner* — D Glenn Dayoan
*Assistant Examiner* — Melissa A Black
(74) *Attorney, Agent, or Firm* — R. Keith Harrison

(57) ABSTRACT

A tailgate food preparation assembly includes an assembly trailer; a main storage bin carried by the assembly trailer; a mobile storage bin carried by the assembly trailer adjacent to the main storage bin, the mobile storage bin having a pair of front frame corners; and a storage bin hinge pivotally connecting the mobile storage bin to the assembly trailer at one of the pair of front frame corners. The mobile storage bin may be positional between a forward, storage and transport position and a rearward, food preparation position.

18 Claims, 9 Drawing Sheets

TAILGATE FOOD PREPARATION ASSEMBLY

CROSS-REFERENCE TO RELATED APPLICATIONS

This application claims the benefit of U.S. provisional application No. 62/274,590, filed Jan. 4, 2016 and entitled TAILGATE FOOD PREPARATION ASSEMBLY, which provisional application is hereby incorporated by reference herein in its entirety.

FIELD

Illustrative embodiments of the disclosure generally relate to tailgate assemblies for connection to a towing vehicle and facilitating the storage, transport, preparation and consumption of food at a tailgating event. More particularly, illustrative embodiments of the disclosure relate to a tailgate food preparation assembly which can be coupled to a towing vehicle and includes various cooking accessories and storage facilities for storage, transport, preparation and consumption of food at tailgating events.

SUMMARY

Illustrative embodiments of the disclosure are generally directed to a tailgate food preparation assembly which can be coupled to a towing vehicle and includes various cooking accessories and storage facilities for storage, transport, preparation and consumption of food at tailgating events. An illustrative embodiment of the tailgate foot preparation assembly includes an assembly trailer; a main storage bin carried by the assembly trailer; a mobile storage bin carried by the assembly trailer adjacent to the main storage bin, the mobile storage bin having a pair of front frame corners; and a storage bin hinge pivotally connecting the mobile storage bin to the assembly trailer at one of the pair of front frame corners. The mobile storage bin may be positional between a forward, storage and transport position and a rearward, food preparation position.

BRIEF DESCRIPTION OF THE DRAWINGS

Illustrative embodiments of the disclosure will now be described, by way of example, with reference to the accompanying drawings, wherein.

DETAILED DESCRIPTION

Figure 1:
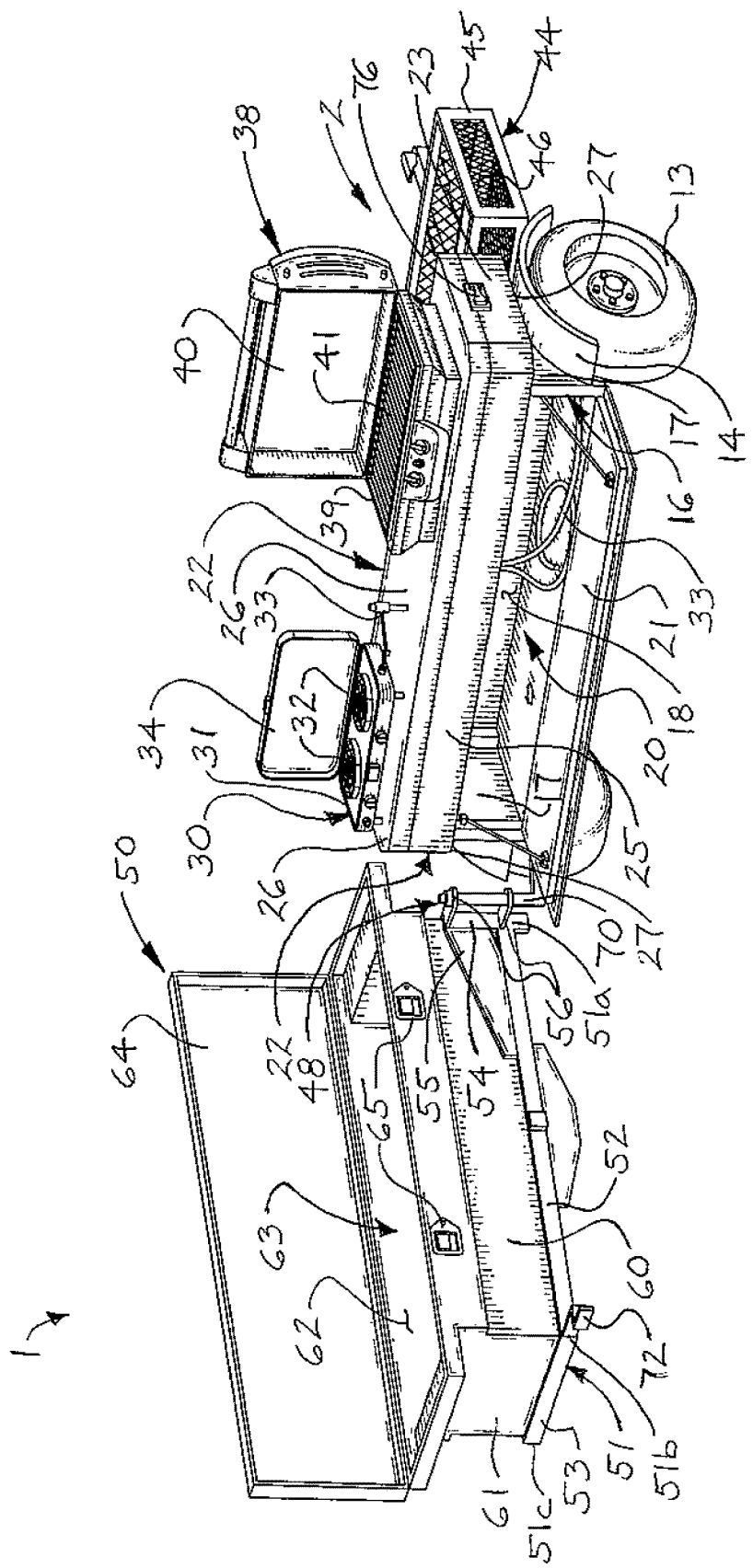
FIG. 1 is a rear perspective view of an illustrative embodiment of the tailgate food preparation assembly, with a mobile storage bin deployed in a rearward food preparation position relative to a main storage bin of the tailgate food preparation assembly.

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Referring to the drawings, an illustrative embodiment of the tailgate food preparation assembly, hereinafter assembly, is generally indicated by reference numeral 1. As particularly illustrated in FIGS. 7A and 7B, the assembly 1 may include an assembly trailer 2. In some embodiments, the assembly trailer 2 may include a trailer platform 3. The trailer platform 3 may include a main platform portion 4 and an extended platform portion 10 which extends forwardly from the main platform portion 4. The main platform portion 4 of the trailer platform 3 may be generally rectangular in shape, with a pair of front platform corners 4a and a pair of rear platform corners 4b. The extended platform portion 10 may be tapered and may extend forwardly from the main platform portion 4 between the front platform corners 4a. The trailer platform 3 may be fabricated of steel, aluminum, composite and/or other rigid and durable materials which are suitable for the purpose.

Figure 5:
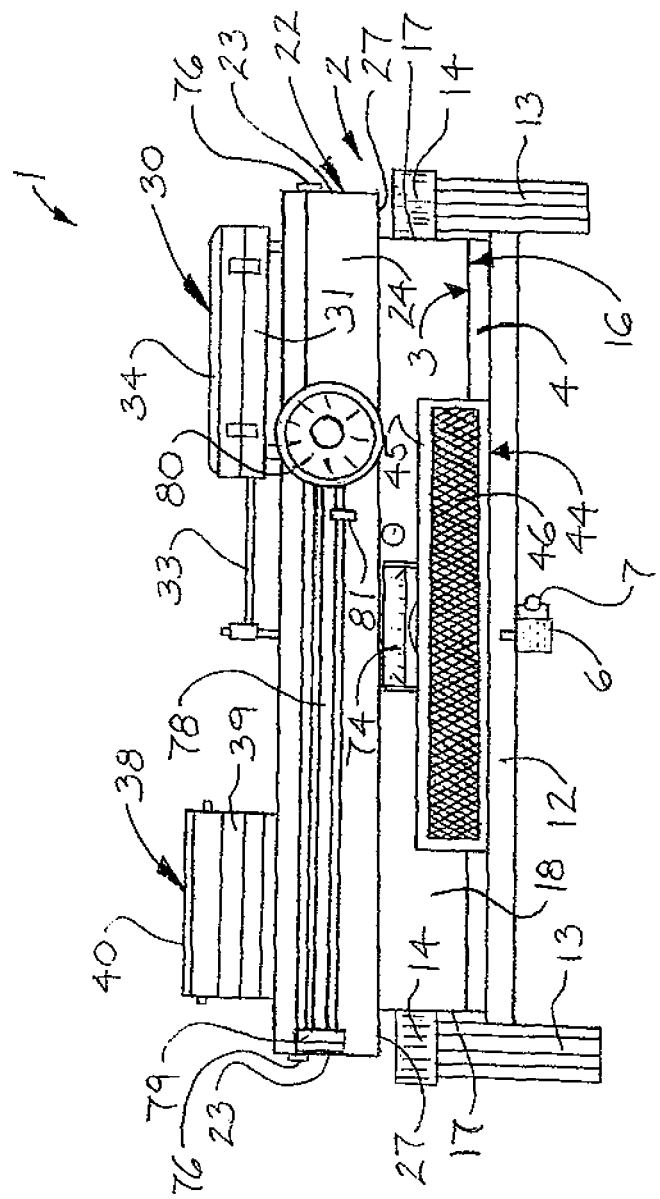
FIG. 5 is a front view of the illustrative tailgate food preparation assembly, with a light support and light on the assembly deployed in a lowered, non-functional position.
Figure 6:
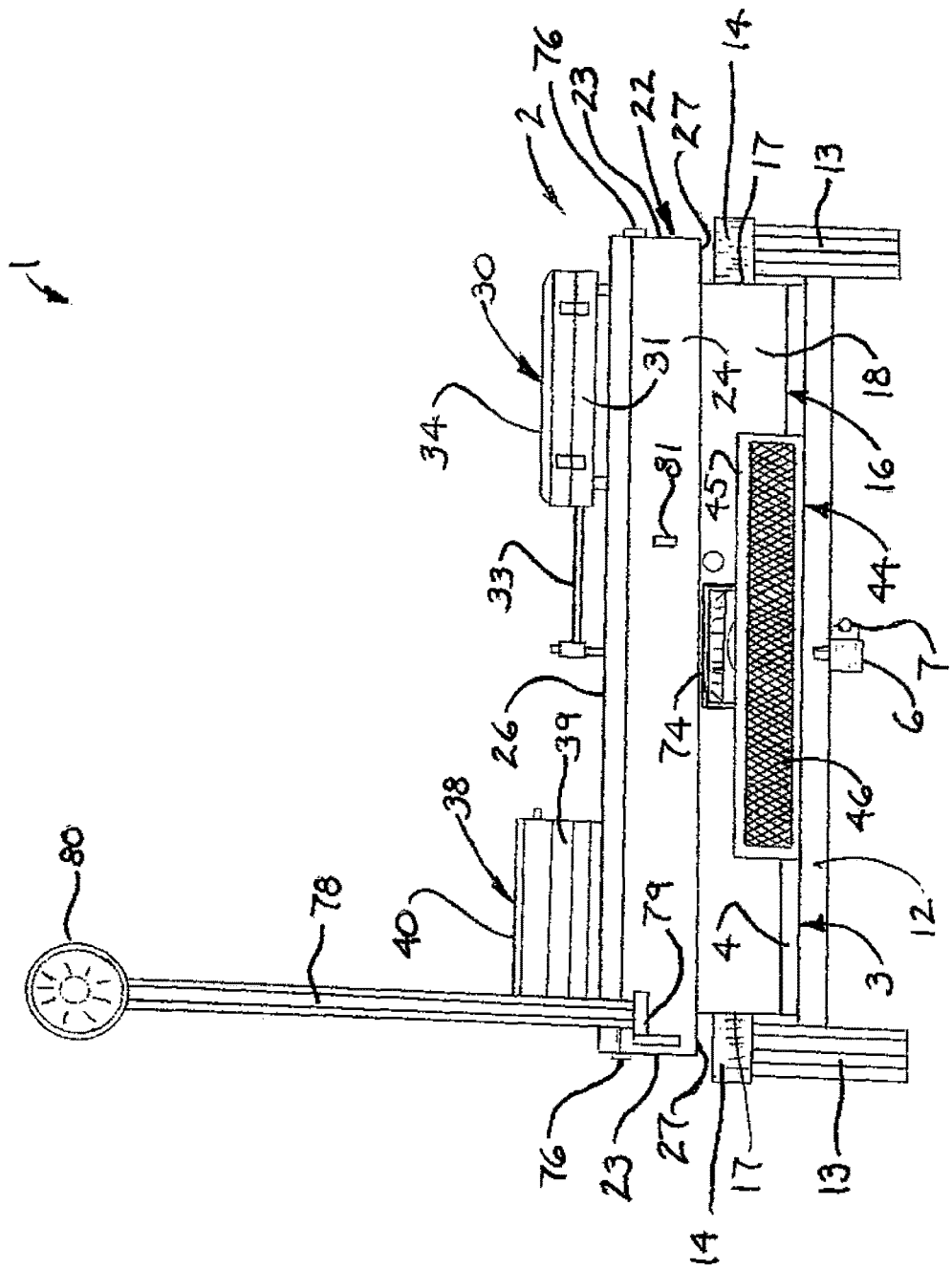
FIG. 6 is a front view of the illustrative tailgate food preparation assembly with the light support and light deployed in a raised, functional position for illumination of an area around the assembly in typical application of the assembly.

An elongated trailer tongue 5 may extend forwardly from the extended platform portion 10 of the trailer platform 3. A hitch coupling 6, which may be conventional, may terminate the forward end of the trailer tongue 5. A tongue wheel mount 7 may be mounted on the trailer tongue 5, typically via a tongue wheel mount bracket 9. The tongue wheel mount 7 may be fitted with a tongue wheel 8. Accordingly, the tongue wheel mount bracket 9 may pivotally mount the tongue wheel mount 7 with respect to the trailer tongue 5 between a horizontal stowed position illustrated in FIGS. 7A and 7B, in which the tongue wheel mount 7 is parallel and adjacent to the trailer tongue 5, and a vertical functional position (not illustrated) in which the tongue wheel mount 7 is perpendicular to the trailer tongue 5 to deploy the tongue wheel 8 on the ground and support the trailer tongue 5, typically in the conventional manner. As illustrated in FIGS. 5 and 6, the trailer platform 3 of the assembly trailer 2 may be fitted with a trailer axle 12 fitted with a pair of trailer wheels 13. Wheel covers 14 may be provided on opposite sides of the trailer platform 3 to cover the wheels 13.

A main storage bin 16 may be provided on the trailer platform 3. In some embodiments, the main storage bin 16 may be generally elongated and rectangular with a pair of spaced-apart main storage bin sidewalls 17 and a front storage bin wall 18 extending between the main storage bin sidewalls 17. The main storage bin sidewalls 17 and the front storage bin wall 18 may be welded, bolted and/or otherwise attached to the trailer platform 3 according to the knowledge of those skilled in the art. As illustrated in FIG. 1, the main storage bin 16 may have a main storage bin interior 20, the purpose of which will be hereinafter described. A main storage bin door 21 may be pivotally attached to the main platform portion 4 of the trailer platform 3 and/or to the main storage bin sidewalls 17 of the main storage bin 16, typically opposite the front storage bin wall 18, to facilitate selective opening and closing of the main storage bin interior 20.

A gas source 88 (FIG. 9) may be provided in the main storage bin interior 20 (FIG. 1) of the main storage bin 16. In some embodiments, the gas source 88 may include a bottle or vessel (not illustrated) which contains a supply of propane or other suitable cooking gas (not illustrated).

Figure 2:
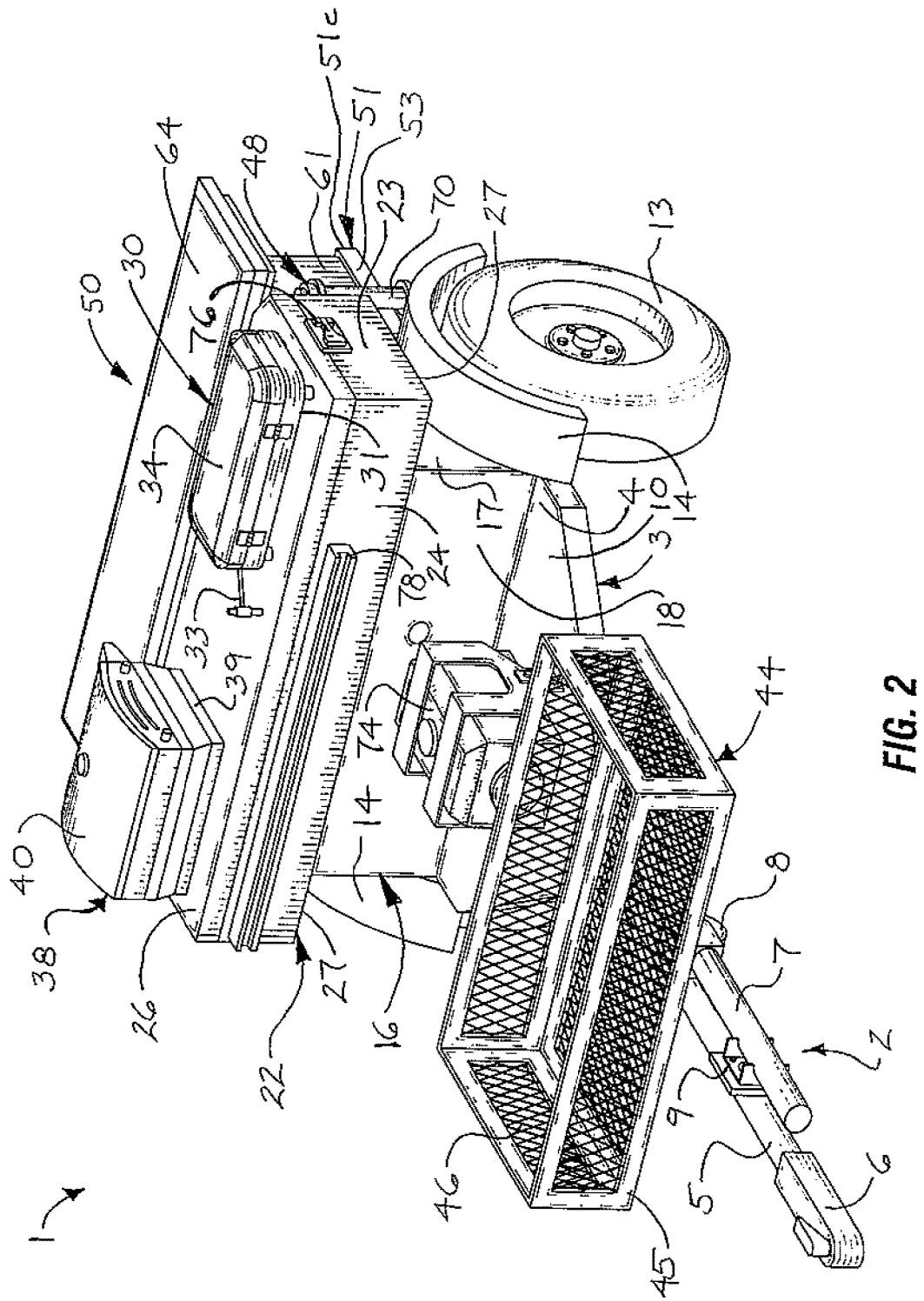
FIG. 2 is a front perspective view of the illustrative tailgate food preparation assembly with the mobile storage bin deployed in a forward storage and transport position.
Figure 3:
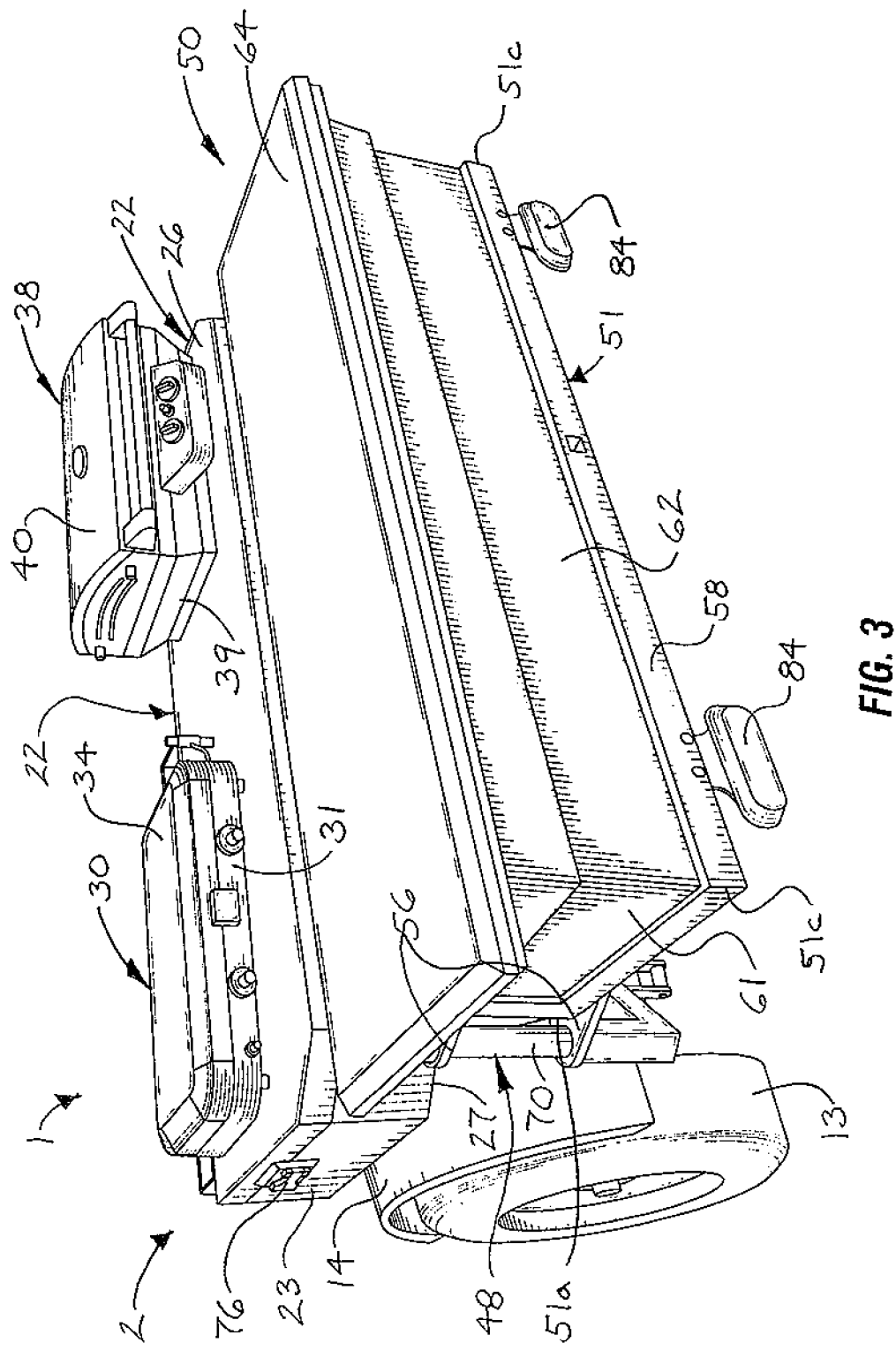
FIG. 3 is a rear perspective view of the illustrative tailgate food preparation assembly, with the mobile storage bin deployed in the storage and transport position.

A cooking table 22 may be provided on the main storage bin 16. In some embodiments, the cooking table 22 may be generally elongated and rectangular in shape. A pair of spaced-apart bottom table panels 27 (one of which is illustrated in FIGS. 1-3) may extend outwardly from the respective main storage bin side walls 17 of the main storage bin 16. The bottom table panels 27 may at least partially overhang the respective wheel covers 14 on the assembly trailer 2. A pair of spaced-apart side table panels 23 may extend upwardly from the respective bottom table panels 27. A front table panel 24 (FIG. 2) and a rear table panel 25 (FIG. 1) may extend between the side table panels 23. A top table panel 26 may be provided on the side table panels 23, the front table panel 24 and the rear table panel 25. The bottom table panels 27, the front table panel 24 and the rear table panel 25 of the cooking table 22 may be welded, bolted and/or otherwise attached to the main storage bin 16 according to the knowledge of those skilled in the art.

Figure 9:
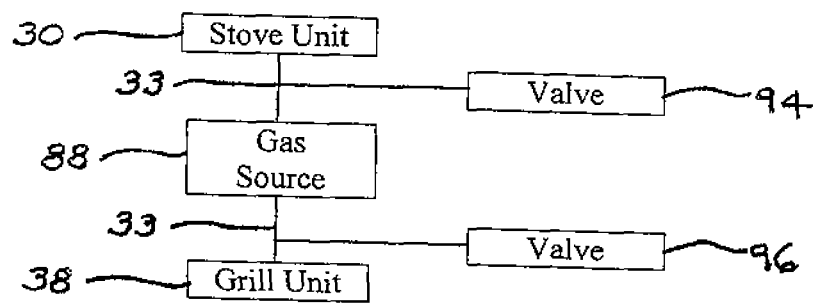
FIG. 9 is a functional block diagram which illustrates typical fluid connection between a gas source and a stove unit and a grill unit of the assembly.

A stove unit 30 may be supported by the top table panel 26 of the cooking table 22. The stove unit 30 may have a conventional design, typically with a stove unit bottom 31 and stove unit burners 32, as illustrated in FIG. 1. A gas conduit 33 may be connected to the stove unit burners 32 through the stove unit bottom 31. The gas conduit 33 may extend through a conduit opening (not illustrated) in the top table panel 26 of the cooking table 22 into the main storage bin interior 20 of the underlying main storage bin 16 for connection to the gas source 88 (FIG. 9) to provide a supply of the cooking gas from the gas source 88 to the stove unit burners 32. A hinged stove unit lid 34 may be pivotally attached to the stove unit bottom 31 to facilitate selective opening and closing of the stove unit 30. Accordingly, in typical application of the assembly 1, which will be hereinafter described, the stove unit 30 facilitates cooking of food on the stove unit burners 32, typically in the conventional manner. As illustrated in FIG. 9, a valve 94 may be provided between the gas source 88 and the stove unit 30 to selectively vary distribution of cooking gas from the gas source 88 to the stove unit burners 32 of the stove unit 30.

A grill unit 38 may be provided on the top table panel 26 of the cooking table 22. The grill unit 38 may have a conventional design with a grill unit bottom 39 which supports a cooking grill 41 (FIG. 1), and a grill unit lid 40 hinged to the grill unit bottom 39. The grill unit 38 may be connected to the gas source 88 (FIG. 9) through the same or a different gas conduit 33 as the gas conduit 33 which connects the stove unit 30 to the gas source 88. Accordingly, the grill unit 38 may facilitate the grilling of food on the cooking grill 41 in typical application of the assembly 1, typically in the conventional manner, as will be hereinafter described. As illustrated in FIG. 9, a valve 96 may be provided between the gas source 88 and the grill unit 38 to selectively vary distribution of cooking gas from the gas source 88 to the cooking grill 41 of the stove unit 30.

Figure 4:
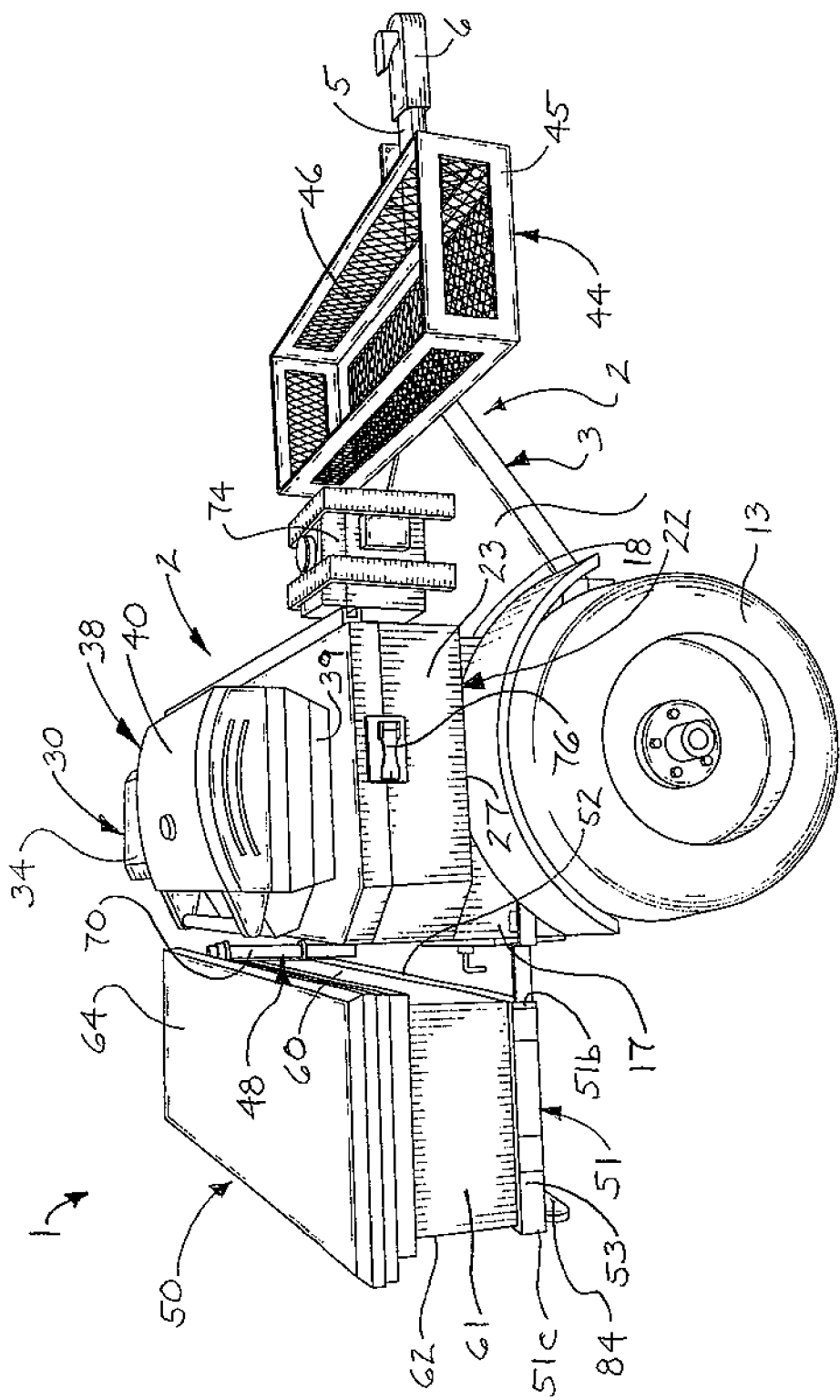
FIG. 4 is a right side view of the illustrative tailgate food preparation assembly with the mobile storage bin deployed in the storage and transport position.

As particularly illustrated in FIGS. 2 and 4, in some embodiments, an accessory basket 44 may be provided on the extended platform portion 10 and/or the trailer tongue 5 of the assembly trailer 2. The accessory basket 44 may be generally elongated and rectangular in shape typically with an accessory basket frame 45 and an accessory basket mesh 46 provided on the accessory basket frame 45. The accessory basket frame 45 and the accessory basket mesh 46 may be fabricated of aluminum or steel, for example and without limitation. Accordingly, various accessories (not illustrated) such as cookware, tableware and/or foldable tables and chairs, for example and without limitation, can be placed in the accessory basket 44 for storage and/or transport in typical application of the assembly 1, as will be hereinafter described.

Figure 7A:
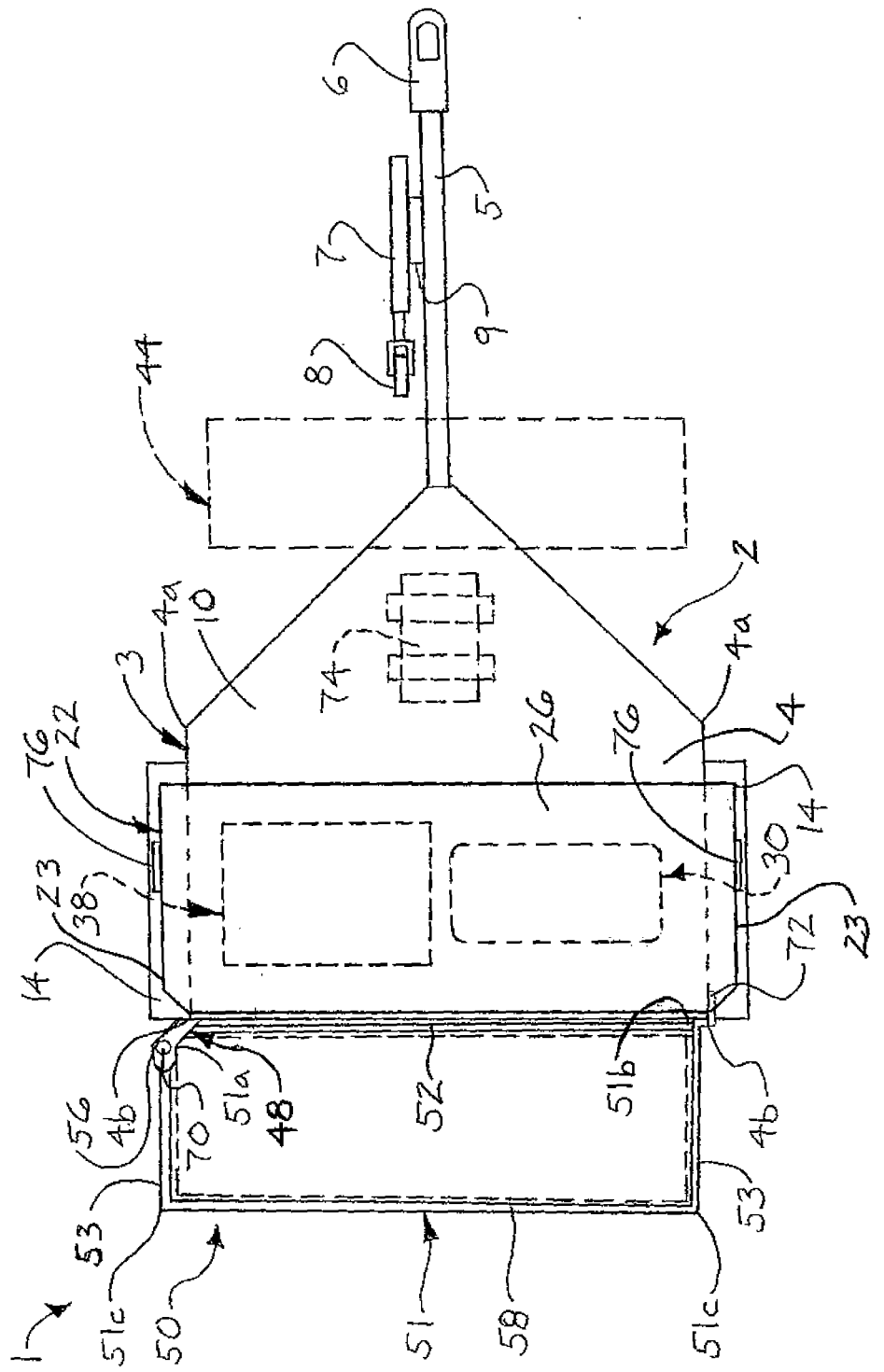
FIG. 7A is a top view of the illustrative tailgate food preparation assembly, more particularly illustrating typical hinged attachment of the mobile storage bin relative to an assembly trailer of the assembly, with the mobile storage bin deployed in the storage and transport position.
Figure 7B:
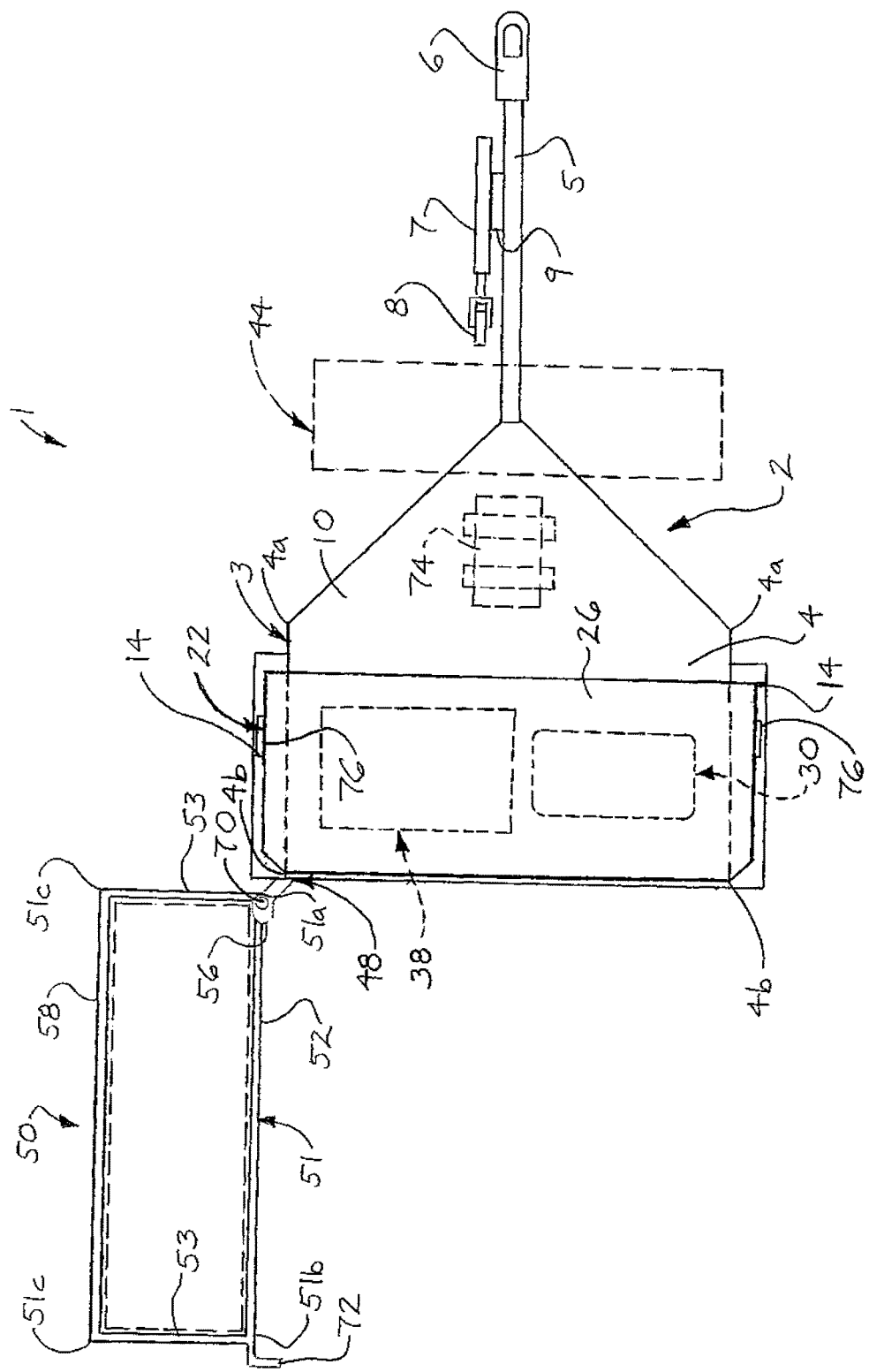
FIG. 7B is a top view of the illustrative tailgate food preparation assembly, with the mobile storage bin deployed in the extended, food preparation position.

An extendible mobile storage bin 50 may be pivotally attached to the assembly trailer 2 behind or adjacent to the main storage bin 16. As illustrated in FIGS. 7A and 7B, the mobile storage bin 50 may include a storage bin support frame 51 which may be generally elongated and rectangular in some embodiments. The storage bin support frame 51 may include an elongated front frame member 52 and an elongated rear frame member 58 disposed in parallel, spaced-apart relationship to each other. A pair of parallel, spaced-apart side frame members 53 may extend between the front frame member 52 and the rear frame member 58. The storage bin support frame 51 may have a pair of front frame corners 51a and 51b, respectively, at the junctions between the front frame member 52 and the respective side frame members 53, and a pair of rear frame corners 51c at the junctions between the rear frame member 58 and the respective side frame members 53. As illustrated in FIG. 3, in some embodiments, a pair of spaced-apart reflectors 84 may be provided on the rear frame member 58 of the storage bin support frame 51.

As illustrated in FIG. 1, a storage bin hinge 48 may pivotally connect the mobile storage bin 50 to the assembly trailer 2 (FIGS. 7A and 7B) at the front frame corner 51a. In some embodiments, the storage bin hinge 48 may include a frame mount member 54 which extends upwardly from the front frame corner 51a of the storage bin support frame 51. A reinforcing gusset 55 may extend between the front frame member 52 and the frame mount member 54. A pair of spaced-apart arm mount flanges 56 may extend from the frame mount member 54 in vertically spaced-apart relationship to each other. A storage bin mount arm 70 may extend upwardly from one of the rear platform corners 4b (FIGS. 7A and 7B) of the main platform portion 4 of the trailer platform 3. Accordingly, the arm mount flanges 56 may pivotally engage the storage bin mount arm 70 to pivotally mount the mobile storage bin 50 such that it is positional between the forward, storage and transport position illustrated in FIGS. 2-4 and 7A and the rearward, food preparation position illustrated in FIGS. 1 and 7B. A storage bin securing flange 72 (FIG. 1) may extend from the opposite front frame corner 51b of the storage bin support frame 51. Accordingly, the storage bin securing flange 72 may normally engage the main storage bin 16 on the assembly trailer 2 to detachably secure the mobile storage bin 50 in the storage and transport position illustrated in FIG. 7A.

As illustrated in FIGS. 1 and 3, in some embodiments, the mobile storage bin 50 may be generally elongated and rectangular with a storage bin bottom (not illustrated) which may be supported by or within the storage bin support frame 51 according to the knowledge of those skilled in the art. A front storage bin wall 60 and a rear storage bin wall 62 may extend upwardly from the storage bin bottom in parallel, spaced-apart relationship to each other. A pair of spaced-apart side storage bin walls 61 may extend upwardly from the storage bin bottom between the front storage bin wall 60 and the rear storage bin wall 62. As illustrated in FIG. 1, the mobile storage bin 50 may have a storage bin interior 63. A storage bin lid 64 may be pivotally attached to the rear storage bin wall 62 to selectively open and close the storage bin interior 63. At least one latch 65 may be provided on the front storage bin wall 60 to secure the storage bin lid 64 in the closed position (FIG. 3).

Figure 8:
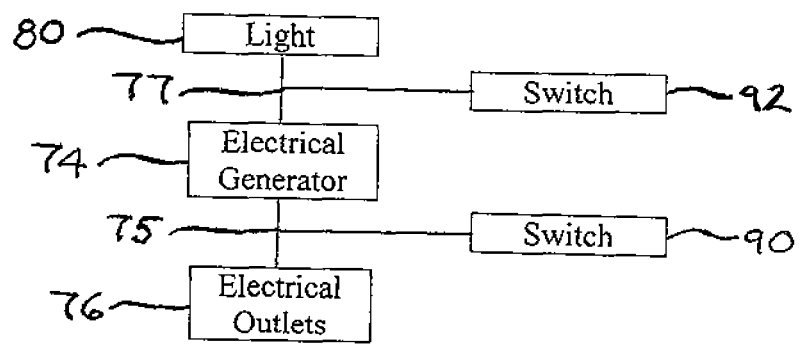
FIG. 8 is a functional block diagram which illustrates typical electrical connection between an electrical generator and a light and electrical outlets in the tailgate food preparation assembly.

As illustrated in FIGS. 2, 4, 7A and 7B, in some embodiments, an electrical generator 74 may be provided on the extended platform portion 10 of the trailer platform 3. As illustrated in FIGS. 2 and 4, in some embodiments, at least one electrical outlet 76 may be provided on the cooking table 22 to provide electrical power to various electrical accessories (not illustrated). The electrical outlet or outlets 76 may be provided on one or both of the side table panels 23 of the cooking table 22, as illustrated, or in any other alternative accessible location. As illustrated in FIG. 8, each electrical outlet 76 may be electrically connected to the electrical generator 74 through suitable wiring 75. In some embodiments, a switch 90 may be electrically connected between the electrical generator 74 and the electrical outlet or outlets 76.

As illustrated in FIGS. 2, 5 and 6, in some embodiments, a light support member 78 may be pivotally attached to the cooking table 22 typically by way of a light support mount bracket 79 (FIGS. 5 and 6). The light support member 78 may be selectively positional between the lowered, horizontal stowage position illustrated in FIG. 5 and the raised, vertical functional position illustrated in FIG. 6. An electrical light 80 may be supported by the light support member 78. As illustrated in FIG. 8, the light 80 may be electrically connected to the electrical generator 74 by way of suitable light wiring 77. Accordingly, responsive to operation of the electrical generator 74, electrical power may be supplied to the light 80 for illumination of the area surrounding the assembly 1 typically when the light support member 78 is deployed in the raised, functional position illustrated in FIG. 6. As illustrated in FIG. 8, in some embodiments, a switch 92 may be electrically connected between the electrical generator 74 and the light 80.

In typical application of the assembly 1, the hitch coupling 6 on the trailer tongue 5 may initially be coupled to a companion hitch receiver (not illustrated) on a towing vehicle. Various cookware such as pots, pans, plates, silverware and the like (not illustrated) may be placed in the storage bin interior 63 (FIG. 1) of the mobile storage bin 50. Additional cooking and/or tailgating supplies such as cookware, tableware and/or foldable tables and chairs, for example and without limitation (not illustrated), may be placed in the accessory basket 44. The mobile storage bin 50 may be deployed in the forward, storage and transport position illustrated in FIGS. 2 and 3 by pivoting the storage bin support frame 51 with respect to the trailer platform 3 at the storage bin hinge 48. As illustrated in FIG. 7A, the storage bin securing flange 72 on the storage bin support frame 51 may engage the main storage bin 16 to secure the mobile storage bin 50 in the storage and transport position.

The assembly 1 may be towed to a desired destination such as a tailgating event at a football game, for example. At the intended destination, the hitch coupling 6 may be uncoupled from the hitch receiver (not illustrated) on the towing vehicle. The tongue wheel mount 7 may be pivoted at the tongue mount bracket 9 from the horizontal stowed position illustrated in FIGS. 7A and 7B to the vertical trailer-supporting position (not illustrated) to support the assembly trailer 2 on the ground. The assembly 1 can be selectively manually transported to the desired position or location on the ground such as by pushing and rolling the assembly trailer 2 on the trailer wheels 13 and the tongue wheel 8.

The mobile storage bin 50 may be deployed in the extended, food preparation position illustrated in FIGS. 1 and 7b by disengaging the storage bin securing flange 72 from the main storage bin 16 and pivoting the storage bin support frame 51 at the storage bin hinge 48. Accordingly, the stove unit 30 and the grill unit 38 are rendered accessible to a user (not illustrated), who can stand immediately behind the main storage bin 16 and cook food on the stove unit burners 32 of the stove unit 30 and/or on the cooking grill 41 of the grill unit 38. The storage bin interior 63 of the mobile storage bin 50 can be selectively opened by pivoting the storage bin lid 64 open to access and retrieve cookware for the cooking operation as well as silverware, plates and the like for consumption of the food. Cookware, plates and/or foldable tables and chairs can be removed from the storage bin interior 63 of the mobile storage bin 50 and/or from the accessory basket 44 and deployed for use.

Under circumstances in which the environment lacks sufficient ambient lighting for the cooking operation and for consumption of the food, the light support member 78 can be selectively deployed from the lowered, non-functional position illustrated in FIG. 5 to the raised, functional position illustrated in FIG. 6. The electrical generator 74 can be operated to provide electrical power to the light 80. When use of the assembly 1 is concluded, the cookware and other accessories can be returned to the mobile storage bin 50 and the accessory basket 44, the mobile storage bin 50 pivoted to the storage and transport position illustrated in FIG. 3 and the hitch coupling 6 on the trailer tongue 5 hitched to the towing vehicle for towing.

While certain illustrative embodiments of the disclosure have been described above, it will be recognized and understood that various modifications can be made to the embodiments and the appended claims are intended to cover all such modifications which may fall within the spirit and scope of the disclosure.

What is claimed is:

1. A tailgate food preparation assembly, comprising:
an assembly trailer including a trailer platform and an elongated trailer tongue extending from the trailer platform;
an elongated main storage bin carried by the trailer platform of the assembly trailer, the main storage bin oriented substantially perpendicular to the trailer tongue of the assembly trailer;

an elongated mobile storage bin carried by the trailer platform of the assembly trailer adjacent to the main storage bin, the mobile storage bin having a pair of front frame corners; and a storage bin hinge pivotally connecting the mobile storage bin to the assembly trailer at one of the pair of front frame corners, the mobile storage bin pivotally positional within a substantially horizontal plane between a forward, storage and transport position wherein the mobile storage bin is substantially parallel to a longitudinal axis of the main storage bin and a rearward, food preparation position wherein the mobile storage bin is substantially perpendicular to the longitudinal axis of the main storage bin.

2. The tailgate food preparation assembly of claim 1 further comprising a cooking table carried by the main storage bin.

3. The tailgate food preparation assembly of claim 2 further comprising a light support member pivotally carried by the cooking table and a light carried by the light support member.

4. The tailgate preparation assembly of claim 2 further comprising at least one of a stove unit and a grill unit carried by the cooking table.

5. The tailgate food preparation assembly of claim 2 further comprising an electrical generator carried by the assembly trailer and at least one electrical outlet carried by the cooking table and electrically connected to the electrical generator.

6. The tailgate food preparation assembly of claim 1 further comprising an accessory basket carried by the assembly trailer.

7. The tailgate food preparation assembly of claim 1 wherein the trailer platform comprises a generally rectangular main platform portion and a tapered extended platform portion extending forwardly from the main platform portion.

8. A tailgate food preparation assembly, comprising:

an assembly trailer including a trailer platform and an elongated trailer tongue extending from the trailer platform, the trailer platform having a pair of rear platform corners;

an elongated main storage bin carried by the trailer platform of the assembly trailer, the main storage bin oriented substantially perpendicular to the trailer tongue of the assembly trailer;

an elongated mobile storage bin carried by the trailer platform of the assembly trailer adjacent to the main storage bin, the mobile storage bin having a pair of front frame corners; and a storage bin hinge pivotally connecting one of the pair of front frame corners of the mobile storage bin to the assembly trailer at one of the pair of rear platform corners, the mobile storage bin pivotally positional within a substantially horizontal plane between a forward, storage and transport position wherein the mobile storage bin is substantially parallel to the main storage bin and a rearward, food preparation position wherein the mobile storage bin is substantially perpendicular to the main storage bin.

9. The tailgate food preparation assembly of claim 8 further comprising a cooking table carried by the main storage bin.

10. The tailgate food preparation assembly of claim 9 further comprising a light support member pivotally carried by the cooking table and a light carried by the light support member.

11. The tailgate food preparation assembly of claim 9 further comprising at least one of a stove unit and a grill unit carried by the cooking table.

12. The tailgate food preparation assembly of claim 8 further comprising an electrical generator carried by the assembly trailer and at least one electrical outlet carried by the cooking table and electrically connected to the electrical generator.

13. The tailgate food preparation assembly of claim 8 further comprising an accessory basket carried by the assembly trailer.

14. The tailgate food preparation assembly of claim 8 wherein the trailer platform comprises a generally rectangular main platform portion and a tapered extended platform portion extending forwardly from the main platform portion.

15. A tailgate food preparation assembly, comprising:

an assembly trailer including:

a trailer platform having a generally rectangular main platform portion and a tapered extended platform portion extending from the main platform portion, the main platform portion having a pair of rear platform corners;

an elongated trailer tongue extending forwardly from the extended platform portion;

a hitch coupling carried by the trailer tongue;

a tongue wheel mount pivotally carried by the trailer tongue; and a tongue wheel carried by the tongue wheel mount;

an elongated main storage bin carried by the assembly trailer, the main storage bin oriented substantially perpendicular to the trailer tongue of the assembly trailer and including a pair of spaced-apart main storage bin sidewalls, a front storage bin wall extending between the main storage bin sidewalls, a main storage bin interior and a pivoting main storage bin door opposite the front storage bin wall to facilitate selective opening and closing of the main storage bin interior;

a cooking table carried by the main storage bin;

a generally elongated and rectangular mobile storage bin carried by the assembly trailer adjacent to the main storage bin, the mobile storage bin including:

a storage bin support frame having a pair of front frame corners and a pair of rear frame corners; and a storage bin bottom carried by the storage bin support frame, a front storage bin wall and a rear storage bin wall extending upwardly from the storage bin bottom in parallel, spaced-apart relationship to each other, a pair of spaced-apart side storage bin walls extending upwardly from the storage bin bottom between the front storage bin wall and the rear storage bin wall, a storage bin interior and a storage bin lid pivotally carried by the rear storage bin wall to selectively open and close the storage bin interior; and a storage in hinge pivotally connecting one of the pair of front frame corners of the storage bin support frame of the mobile storage bin to the main platform portion of the assembly trailer at one of the pair of rear platform corners, the mobile storage bin pivotally positional within a substantially horizontal plane between a forward, storage and transport position wherein the mobile storage bin is substantially parallel to the main storage bin and a rearward, food preparation position wherein the mobile storage bin is substantially perpendicular to the main storage bin and the cooking table is rendered accessible to a user as the user stands immediately behind the main storage bin for cooking food on the cooking table.

16. The tailgate food preparation assembly of claim 15 further comprising a light support member pivotally carried by the cooking table and a light carried by the light support member.

17. The tailgate food preparation assembly of claim 15 further comprising at least one of a stove unit and a grill unit carried by the cooking table.

18. The tailgate food preparation assembly of claim 15 further comprising an electrical generator carried by the assembly trailer and at least one electrical outlet carried by the cooking table and electrically connected to the electrical generator.

\* \* \* \* \*